United States Patent [19]

Berglund

[11] Patent Number: 5,571,382
[45] Date of Patent: Nov. 5, 1996

[54] METHOD OF MEASURING AND CONTROLLING ADHESION/RELEASE OF A PAPER WEB WHICH IS REMOVED BY A DOCTOR BLADE FROM A YANKEE CYLINDER AND A WEB TENSION GAUGE

[76] Inventor: Roode P. Berglund, Musserongången 18, Tyresö, Sweden

[21] Appl. No.: 325,447
[22] PCT Filed: Apr. 29, 1992
[86] PCT No.: PCT/SE92/00281
§ 371 Date: Dec. 13, 1994
§ 102(e) Date: Dec. 13, 1994
[87] PCT Pub. No.: WO93/22134
PCT Pub. Date: Nov. 11, 1994

[51] Int. Cl.$^6$ .................................................. D21F 11/12
[52] U.S. Cl. ........................ 162/198; 162/111; 162/113; 162/281
[58] Field of Search .................... 162/281, 280, 162/252, 262, 49, 198, 111, 112, 113; 73/862.07, 862.45, 37.5, 37.6, 37.7; 156/64

[56] References Cited

U.S. PATENT DOCUMENTS 3,017,317  1/1962  Voigtman et al. ................ 162/111
4,304,625  12/1981  Grube et al. ..................... 162/111
4,448,638  5/1984  Klowak ............................ 162/112
4,711,133  12/1987  Berglund ....................... 73/862.07

FOREIGN PATENT DOCUMENTS 0102146  3/1984  European Pat. Off. .
2030409  2/1971  Germany .
 468123  11/1992  Sweden .
2171801  9/1986  United Kingdom ........... 73/862.451

Primary Examiner—Donald E. Czaja
Assistant Examiner—Calvin Padgett
Attorney, Agent, or Firm—Young & Thompson

[57] ABSTRACT

The release of a crepe paper web (1) from a Yankee-cylinder (4) is carried out with the aid of a doctor blade (5). The web is taken up on a roll (9) under a specific degree of creping. The paper web has a web-part which is drawn freely between the doctor blade and the roll, and with the aid of a device (11, 12) which functions to deliver a substance between the paper web and the Yankee-cylinder for controlling web release. A deformation force is exerted (via 20) on the paper web at a local part of the freely drawn web-part. The resultant positional change at that local web-part is detected so as to obtain an electric signal corresponding to the tension in the paper web. That signal is passed to a control unit (13) for controlling the supply of substance to control release of the paper web from the Yankee-cylinder.

8 Claims, 3 Drawing Sheets

METHOD OF MEASURING AND CONTROLLING ADHESION/RELEASE OF A PAPER WEB WHICH IS REMOVED BY A DOCTOR BLADE FROM A YANKEE CYLINDER AND A WEB TENSION GAUGE

In the manufacture of crêpe-type paper, such as toilet paper, tissue paper, cellulose wadding and similar soft paper products, the wet paper web is placed on a large drying cylinder, a so-called Yankee-cylinder, from which the paper web is then removed by means of a doctor blade and rolled into rolls. The peripheral speed of the drying cylinder is somewhat higher than the speed of the downstream web and the proportional difference between these speeds can be defined as the degree of crêping. One prerequisite for the manufacture of such papers is that the paper web adheres to the surface of the drying cylinder during the drying process, although this adhesion must neither be too strong nor too weak. The extent to which the web will adhere to the drying cylinder is influenced by the quality of the pulp, the additive substances present therein, e.g. softeners, and also by the nature of the surface of the drying cylinder itself. It is well known to treat this surface continuously, by spraying the same with appropriate chemicals at a position between the doctor blade and the location at which the wet paper web is applied to the cylinder. It is also possible to coat the actual web itself, prior to applying the same, for instance as the web passes a felt, or the felt itself can be treated with such chemicals, which are then taken-up by the web as it comes into contact with the felt. The essential criterion is that these chemicals will be applied to the cylinder surface.

One advantageous method of applying such chemicals is described in U.S. Pat. No. 4,448,818, according to which chemicals are sprayed in the form of airborne droplets, i.e. in an aerosol form. One embodiment hereof is sold by Leckners Verkstads AB, Jönköping, Sweden, which enables the application of two different chemicals in desired, controllable mixing proportions, e.g. to thereby increase adhesion or facilitate release.

Efficient operation of present-day machines of this kind depends greatly on the expertise of the machine operator and on many years of practice. The operator is able to observe the amount of waste removed by the cleansing doctor blade located downstream of the web-removing blade in order to judge whether or not the chemical coating shall be changed and, if so, how. It is normal to control the degree of crêping constantly, by adjusting the motors that drive respective drying cylinders and upstream equipment and also to adjust the speed at which the treated paper web is rolled-up into rolls. If adhesion is too high or too low, the paper web is liable to be torn to pieces, with subsequent stoppages in operation.

An object of the present invention is to provide better possibility of controlling the course of such paper manufacture, either so that the machine operator is better able to judge how web release/adhesion should be adjusted, or preferably to enable release/adhesion to be regulated automatically, so as to enable consistent, uniform production to be achieved, even though the conditions should change somewhat.

Conditions can change in many ways. For example, the quality of the pulp can change during its manufacture; temperature conditions can also change; the doctor blade can be influenced by wear, as also, although slower, the metallic surface of the drying cylinder, which, furthermore, may have a certain "memory" from earlier operations, in that a change in spraying on said coating will not stabilize release and/or adhesion of the paper web respectively until a given length of time has lapsed. Accordingly, it is also an object of the present invention to enable even pulp material to be worked, which is difficult to work.

Contactless arrangements for measuring web tension in paper manufacturing processes are known from U.S. Pat. No. 4,711,133. With constructions of this kind, there is arranged in a fixed surface, against which the paper is drawn, a chamber pressurized via a choke and separate and surrounding thereo a measuring chamber, where the pressure is measured, giving a measure of web tension, being a measure of the movement of the paper web. measurement of the web tension, since said pressure is a measurement of the movement of the paper web. This measuring principle, however, does not function well when the paper is permeable, as is often the case when the paper measured is soft paper, tissue paper or cellulose wadding. Accordingly, a special object of the invention is to provide a web tension gauge where instead of measuring a pressure, movement of a moveable measuring head can be measured directly, said head deforming the paper web with a constant or almost constant force.

Use of this contactless web tension gauge, however, is not restricted to the application described above, where it can be used to particular benefit, since the arrangement has general use both in the manufacture of paper and, for instance, in the control of printing presses. The arrangement is highly flexible, particularly since it is possible to adjust the applied air pressure and thereby obtain measuring intervals which cover different high web tensions.

The invention will now be described with reference to an exemplifying embodiment thereof and also with reference to the accompanying drawings.

Figure 1:
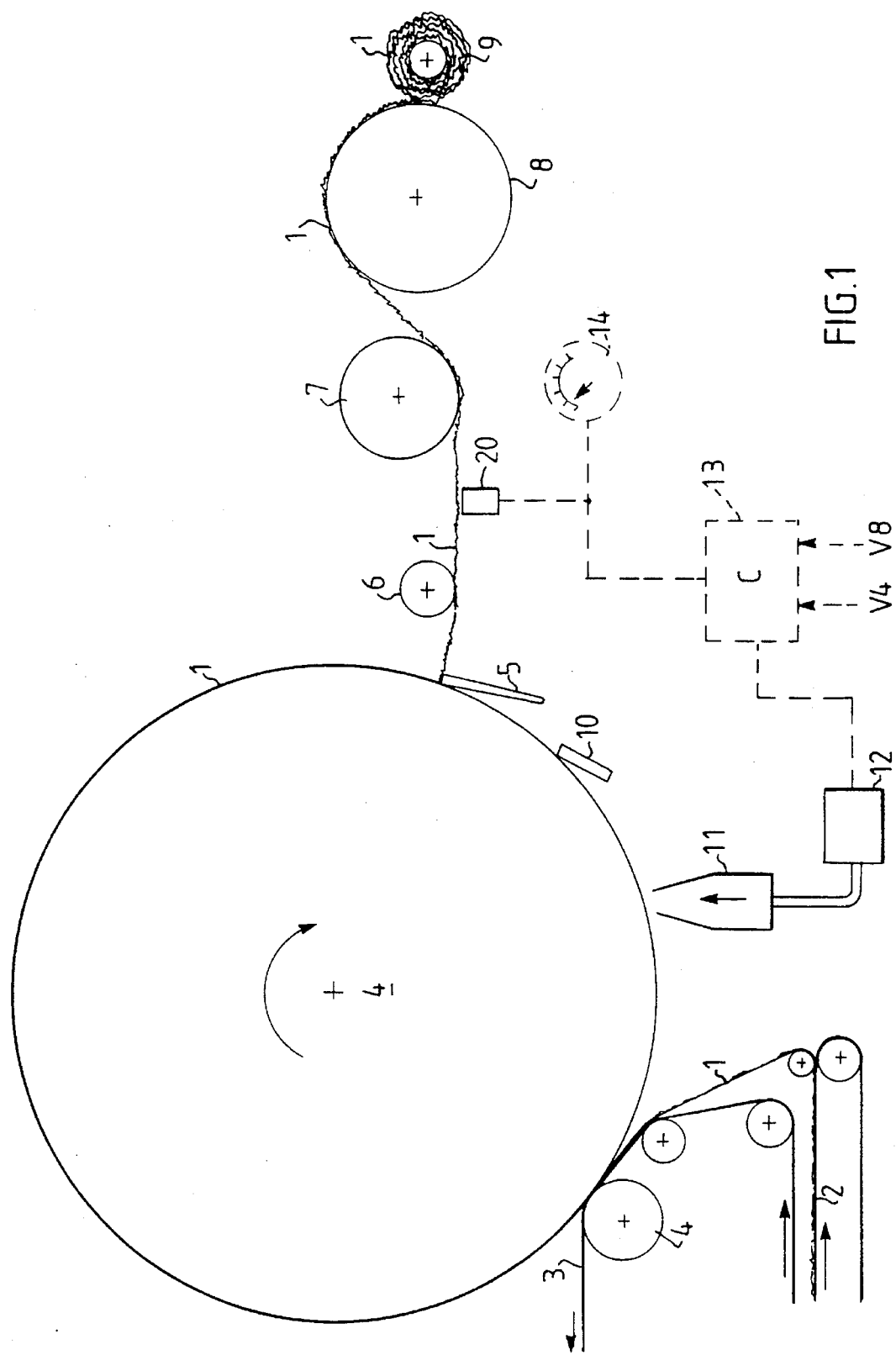
FIG. 1 illustrates schematically a drying section in a paper machine equipped with a Yankee-cylinder and a doctor blade.

FIG. 1 illustrates schematically a machine of the kind with which the invention is concerned. A paper web 1 is taken from a wire (not shown) and laid on a belt 2, where it is pressed against a heated drying cylinder 4, a so-called Yankee-cylinder by means of a felt web 3 and a press roller 4'. The web 1 is then removed from the drying cylinder by means of a doctor blade 5, while crêping the web. The drying cylinder is normally surrounded by a drying hood, not shown. The web 1 is drawn loose from the drying cylinder at the place where the doctor blade 5 meets the drying cylinder 4, through the intermediary of guide rollers 6 and 7 and a POP-cylinder 8. The finished paper is rolled-up on a drum 9 which rolls against the POP-cylinder. Against the drying cylinder at a point downstream of the web-removing doctor-blade 5 works a cylinder cleaning blade 10. Downstream of the blade 10 is a coating device 11 which is connected to a chemical source 12, which may be of the type in which an aerosol coating is obtained, as described above.

In accordance with the invention, there is provided adjacent a free web-part downstream of the doctor blade 5 a device 20 by means of which removal of the web from the drying cylinder can be constantly monitored, wherein a force is applied locally against the paper web and the change in position of the web as a result of said force is measured, whereby a measure is obtained for the resistance offered against release of the paper web from the surface of the cylinder 4. It is true that a major part of the web release work is effected by advancing the cylinder 4 past the doctor blade, and hence the conditions are complicated. It has been found experimentally, however, that although the variable measured would seem to be the tension in the paper web, the measuring result obtained is, to a large extent, correlated with web adhesion and web release and reacts rapidly and responsively to different changes in the process parameters. For example, it has been discovered experimentally that when the degree of crêping is changed, i.e. the relative web speeds are changed, the web tension will increase when the degree of crêping decreases.

In accordance with the invention, this effect can now be used to control the machine, by transferring measuring signals from the measuring device 20 to a control unit 13 which controls the chemical source 12 in a manner which will ensure that a suitable amount of release agent and/or adhesive agent will be delivered by the coating device 11. The control unit 13 may optionally also be supplied with information concerning the speeds of the web 1 over the cylinder 4 (V4) and over, e.g., the POP-cylinder 8 (V8) respectively. The control unit 14 may also form part of a complete computer control system for controlling the machine as a whole. It is also suitable to provide an indicating instrument 14 in order to indicate visually how the measured parameter varies, since extreme values can mean a risk of web fracture or other operational disturbances occurring earlier in the system.

Although the measuring device 20, illustrated solely schematically in FIG. 1, may comprise any resilient device which moves against the web and the indication given by the device is measured and produces an electric output signal, it is preferred to use a pneumatic contactless device, such as the device described with reference to FIG. 2.

As before mentioned, compressed-air web-tension gauges are known to the art. These known gauges include a nozzle through which air is sprayed onto a web and the resultant deformation of a freely-moving part of the web is measured. In the present case, however, there are particular demands on the device, because the web is relatively thin and weak, particularly when it is a paper tissue web or a cellulose wadding web. Moreover, the web is not airtight. In accordance with this aspect of the invention, in order to master the problem, it is proposed that there be used a gauge which is provided with a moveable nozzle by means of which compressed air can be directed against the web and which is held spaced from the web by means of an air cushion.

Figure 2:
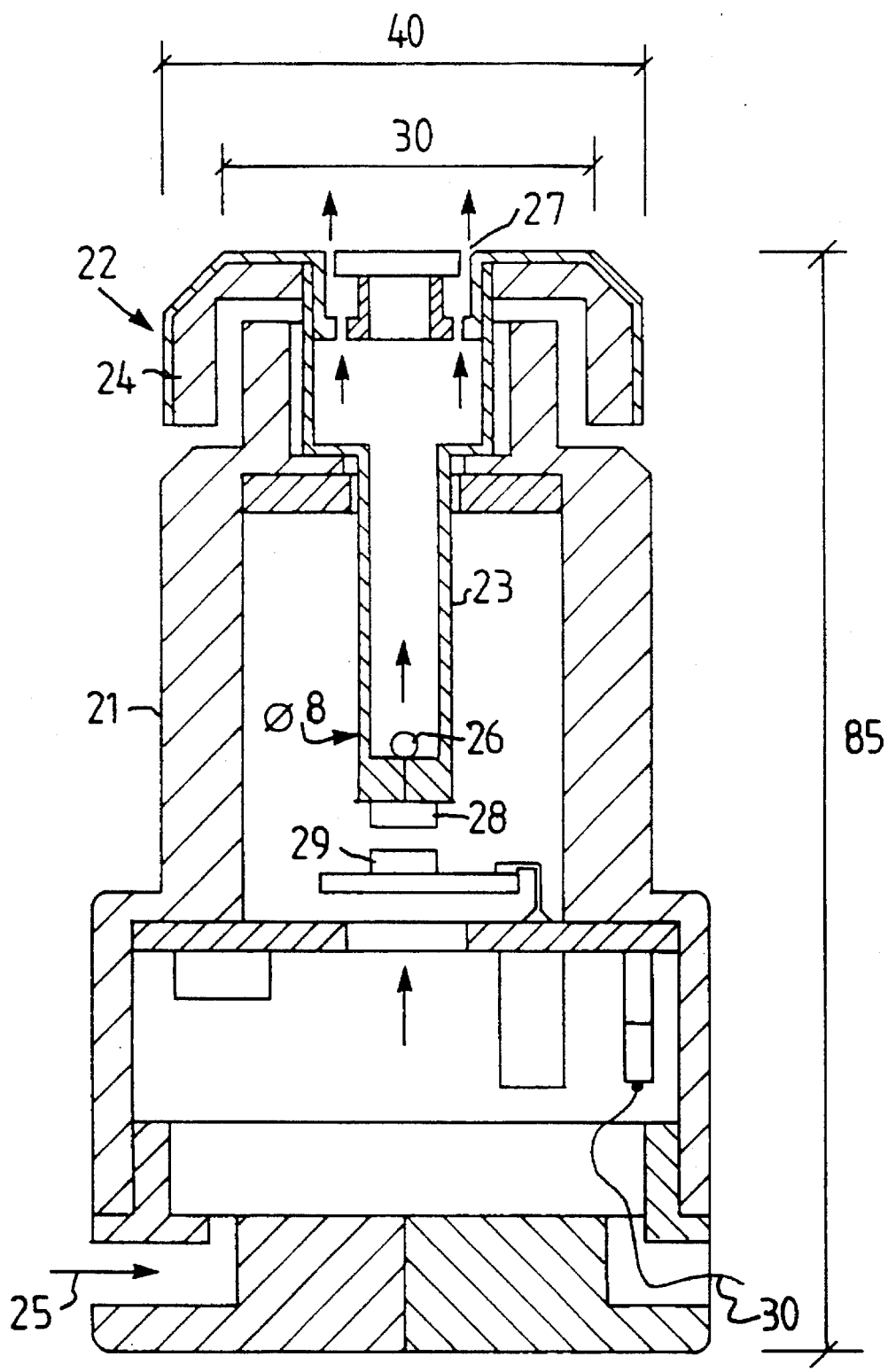
FIG. 2 illustrates a web tension gauge.

FIG. 2 is a drawn-to-scale cross-sectional view of a non-limiting exemplifying embodiment of a cylindrically symmetrical device. A fixedly mountable holder 21 has pistonwise mounted therein a mushroom-like moveable part 22 having a hollow shaft 23 which moves in an air bearing. The moveable part has externally of the piston part a skirt part 24 which surrounds part of the holder and functions to produce damping. Air can be delivered through an inlet 25 and follows the path indicated by the arrows in the Figures. The air pressure biases the shaft 23 for movement in an outward direction. Air enters the shaft 23 through a hole 26 and continues towards the end part, at which one or more air openings 27 are disposed. In the illustrated case, the device has ring-shaped aperture in a plane which is generally at right angles to the shaft 23. The combination of the openings 26 and 27 produces a throttling effect of appropriate magnitude, which in use will determine the distance at which the measuring surface is spaced from the paper web.

A position sensor is comprised of a component 28 fixed in the moveable part, and a further component 29 in the fixed part, this latter part producing through the conductor 30 an electric signal which corresponds to the relative distance. In the illustrated case, the component 28 is a permanent magnet and the component 29 is a standard-type Hall-element. Indicated in the Figure is a pre-amplifying electronic part to which supply lines (not shown) are connected.

EXAMPLE

The moveable part of a device constructed in accordance with the above description weighed 10.0 grams. It was possible to nullify the weight of the moveable part with an overpressure of 0.275 bar. A plate attached to a moveable balance arm was mounted above the upper surface of the device and a varying overpressure was applied, an air gap being formed between the device and the plate, and the force acting on the plate was determines by weighing. The results obtained are set forth in Table I, the effective surface pressure being calculated on the basis of the calculated effective surface.

TABLE I

| Applied pressure, bar | Force, gram | gram/cm² |
|---|---|---|
| 0.30 | 0.75 | 0.10 |
| 0.35 | 2.20 | 0.3 |
| 0.40 | 3.60 | 0.51 |
| 0.45 | 4.90 | 0.70 |
| 0.50 | 6.40 | 0.91 |
| 0.55 | 7.80 | 1.11 |
| 0.60 | 9.20 | 1.31 |
| 0.65 | 10.70 | 1.53 |
| 0.70 | 12.00 | 1.71 |
| 0.75 | 13.50 | 1.93 |
| 0.80 | 15.00 | 2.14 |

It will be seen from Table I that the force exerted is linearly dependent on the pressure, within measurement errors. This force is preferably held constant, by taking air from a stabilized pressure source, for instance from a high-grade reduction valve (not shown).

Figure 3:
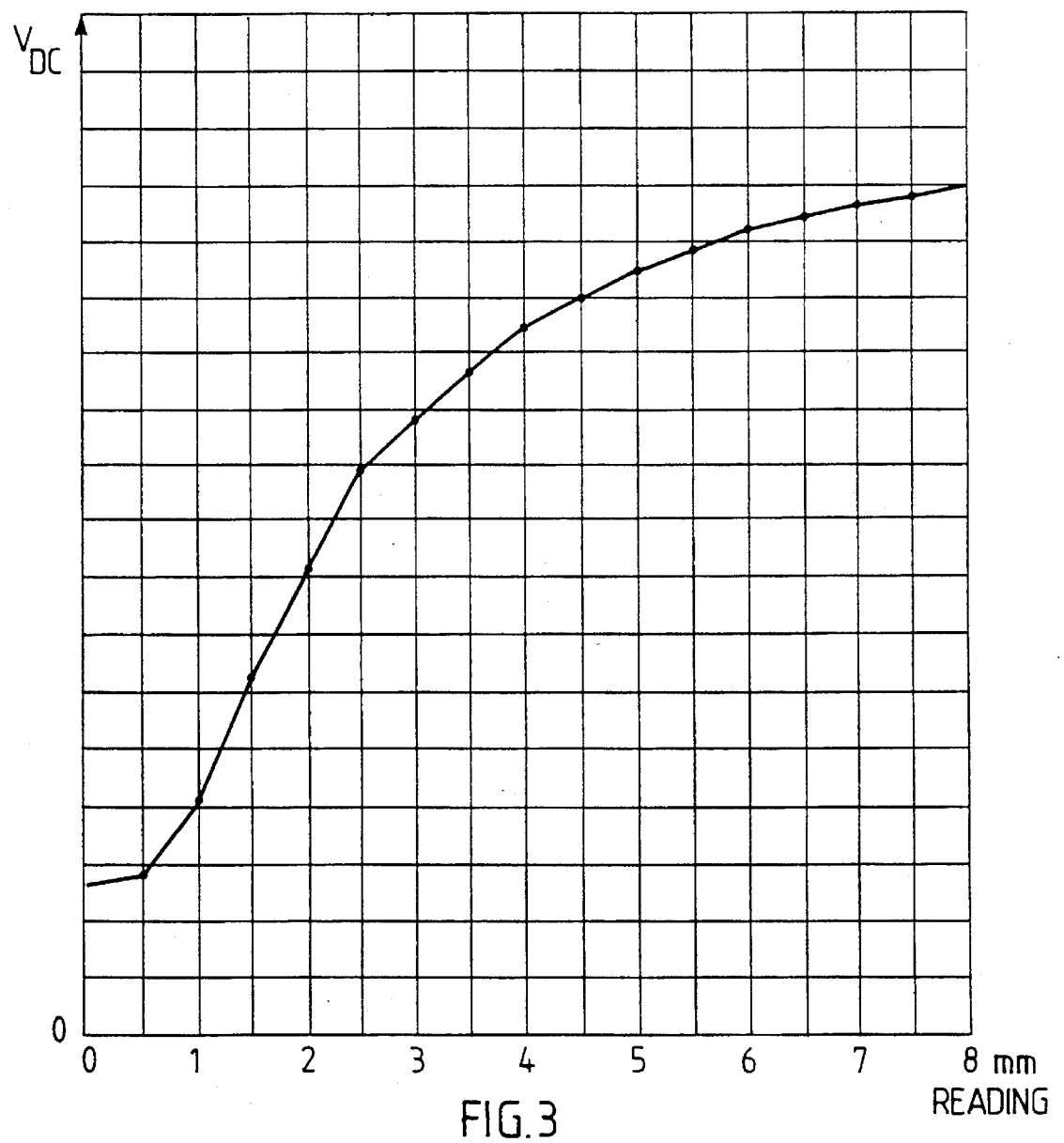
FIG. 3 is a diagram showing the electric signal produced by the web tension gauge as a function of gauge response or gauge reading.

FIG. 3 is a diagram which shows the signal of the Hall-effect sensor as a function of the movement of the shaft between a fully withdrawn and a maximum extended position, the length of stroke of the shaft being determined at 8 mm by stop means not shown in FIG. 2. It will be seen that the signal is not linear. However, since the deflections are relatively small in practice, this will have only slight significance and the person skilled in this art will realize that any linearization necessary can be effected in many different ways.

When used in accordance with the FIG. 1 illustration, the device is mounted beneath the paper web moving freely between two rollers, for instance so that when not supplied with air the measuring surface will be located from 4–5 mm beneath the web. The applied air pressure, e.g. 0.50 bar, is controlled by means of a reduction valve and determines the deformation force exerted on the paper web, essentially independently of the extent to which the piston is extended. The measuring surface will locate itself at a constant distance from the paper web (provided that the applied air pressure is constant), e.g. about 300 µm, and if the paper web becomes, e.g., slacker, the measuring surface will follow the web as it moves under the influence of the generally constant deformation force. The fact that the deformation force is, as far as can be established, constant, provided that the supply pressure is constant, is a surprising effect which, together with freedom from contact during a measuring process, renders the device particularly useful for controlling the supply of surface-treating agent to a Yankee-cylinder in the manufacture of crêped paper.

It has been assumed in the aforegoing that the degree of crêping is maintained constant, e.g. by effecting an r.p.m.

control, wherein, in accordance with the invention, the adhesion of the web to the drying cylinder and the release of the web therefrom respectively is controlled by controlling the coating equipment. Other control principles are possible, due to the presence of a functional relationship between the input variables, such as the different web speeds, web tension, etc., paper-web thickness, drying cylinder temperature, and the moisture, temperature and flow conditions beneath the drying hood covering the drying cylinder, these conditions determining humidity and other well-known variables. In recent years, in automatic process control systems, progressively more of the variables that can be measured have begun to be taken into account. It is assumed that the inventive method can also be applied in such context, where the measured web tension is one such variable, which can be used to control the process and the measurement value of which is then able to influence, in a complicated manner, several different settings, including the aforesaid cylinder coating.

I claim:

1. In a method of controlling release of a paper web (1) from a Yankee-cylinder (4) with the aid of a doctor blade (5), said web being taken up on a roll (9) under a specific degree of creping, wherein the paper web has a web-part which is drawn freely between the doctor blade and the roll, and with the aid of a device (11, 12) which functions to deliver a substance between the paper web and the Yankee-cylinder for controlling web release; the improvement comprising exerting a deformation force (via 20) on the paper web at a local part of the freely drawn web-part; detecting the resultant positional change at said local web-part so as to obtain an electric signal corresponding to the tension in the paper web; and passing said signal to a control unit (13) for controlling the supply of said substance to control release of the paper web from the Yankee-cylinder.

2. A method according to claim 1, further comprising controlling the ratio between the peripheral speed of the Yankee-cylinder and the speed of the paper web subsequent to its removal from the cylinder in a manner to maintain said ratio constant.

3. A method according to claim 1, wherein said deformation force is exerted by an air jet.

4. A method according to claim 1, wherein the deformation force is exerted through the medium of air ejected through an opening in a surface which is movable towards and away from the paper web and which is arranged on one end of a telescopic piston device (23) which is movable towards the paper web through the action of compressed air and which is accommodated in a stationary cylinder device (21), said electric signal being derived from a position determining device which determines or measures the relative position between the piston device and the cylinder device.

5. A method according to claim 4, wherein compressed air is delivered through a constriction (27) of the piston device, such that compressed air is ejected therefrom through the opening provided in said surface.

6. In an apparatus for contactless measuring the tension in a paper web, said apparatus including nozzle means for spraying air onto a movable paper web, and means for measuring web movement caused thereby; the improvement wherein said apparatus further comprises a fixedly mounted holder (22), a mushroom-like nozzle part (23, 24) having a shaft (23) and arranged telescopically in the form of a piston in said holder; means (25) for delivering compressed air at stable pressure to the holder (21) so as to exert an outwardly acting pressure on the shaft (23) of said nozzle part to extend the shaft (23) and for ejecting air (27) from the nozzle part (22) in a direction opposite to its shaft (23); and means (28, 29) for determining the extent to which the shaft (23) is extended and to produce an electric signal (30) corresponding to said extent.

7. An apparatus according to claim 6, wherein the end of the nozzle part nearest the web has provided thereon a skirt part (24) which is directed towards said shaft and which lies outside a part of the fixedly mountable holder which projects into said skirt to an extent which corresponds to the extent to which the shaft (23) is extended.

8. An apparatus according to claim 6, wherein the means for determining the extent of shaft movement includes a magnet (28) fixed to the piston device and a Hall-effect detector (29) mounted centrally opposite the magnet.

* * * * *